G. V. JOHNSTON.
METHOD AND APPARATUS FOR BUTT WELDING THIN GAGE TUBING.
APPLICATION FILED JUNE 9, 1919.
1,388,434.
Patented Aug. 23, 1921.
9 SHEETS—SHEET 9.
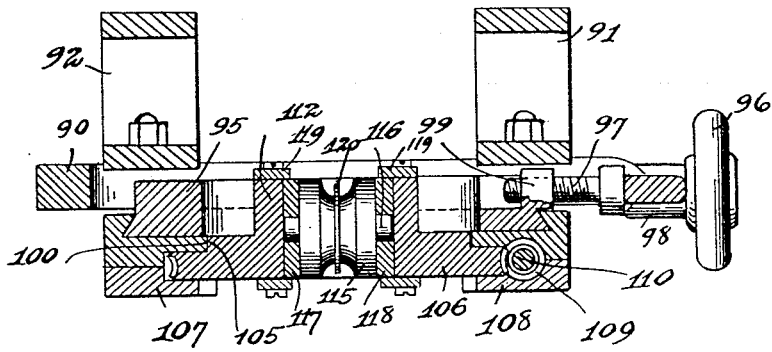
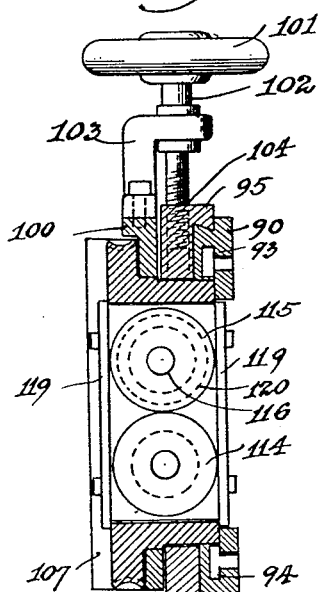
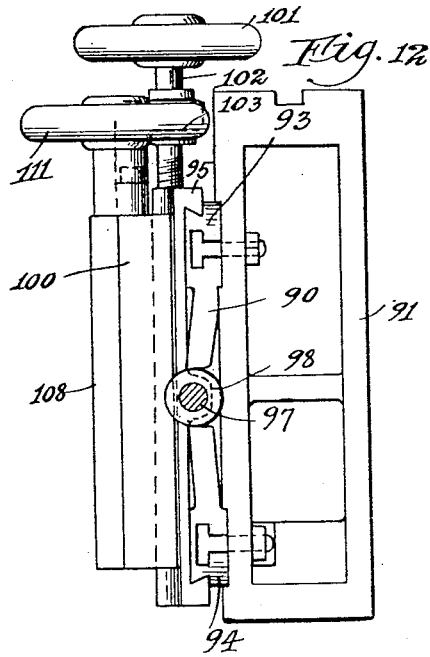

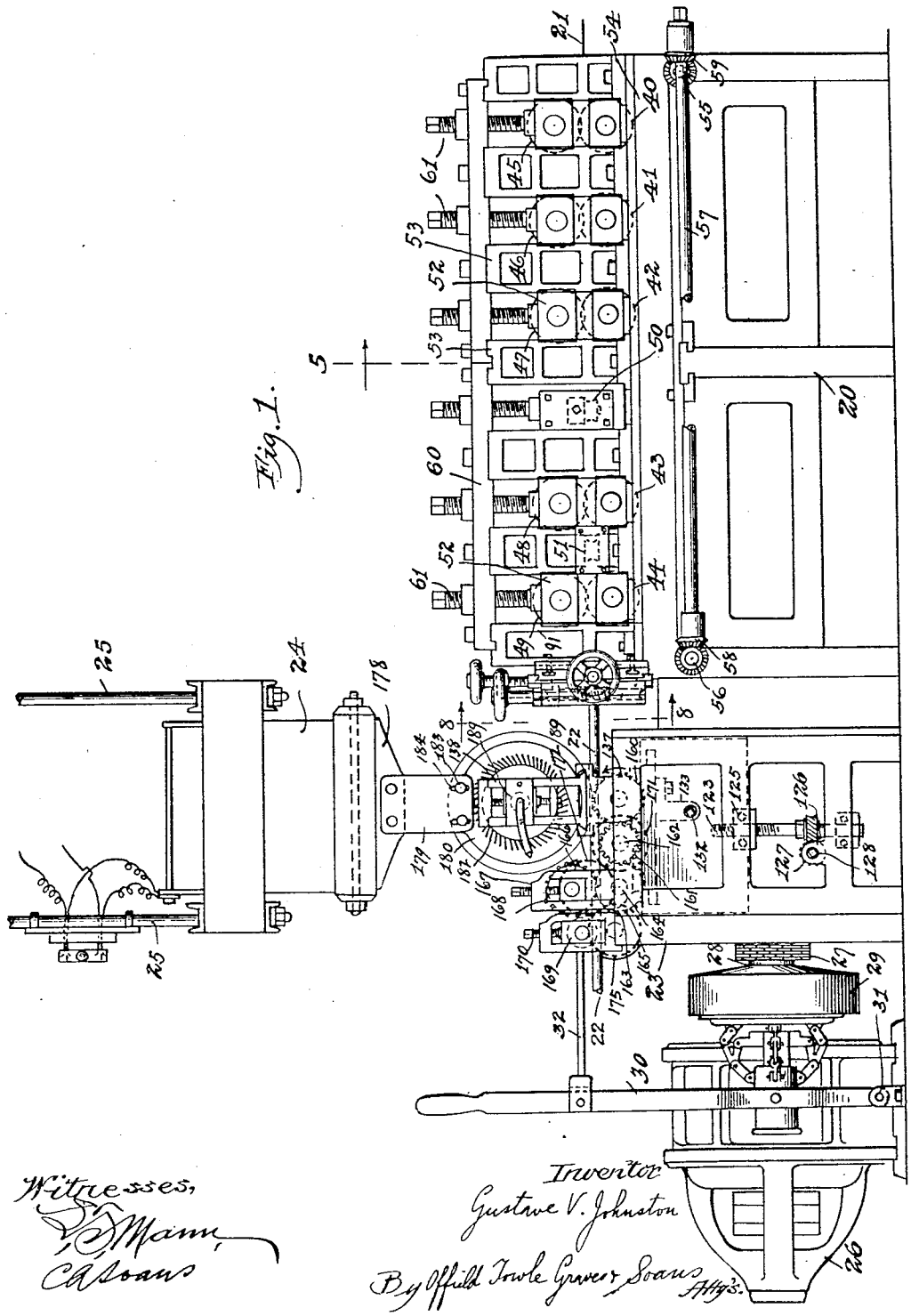

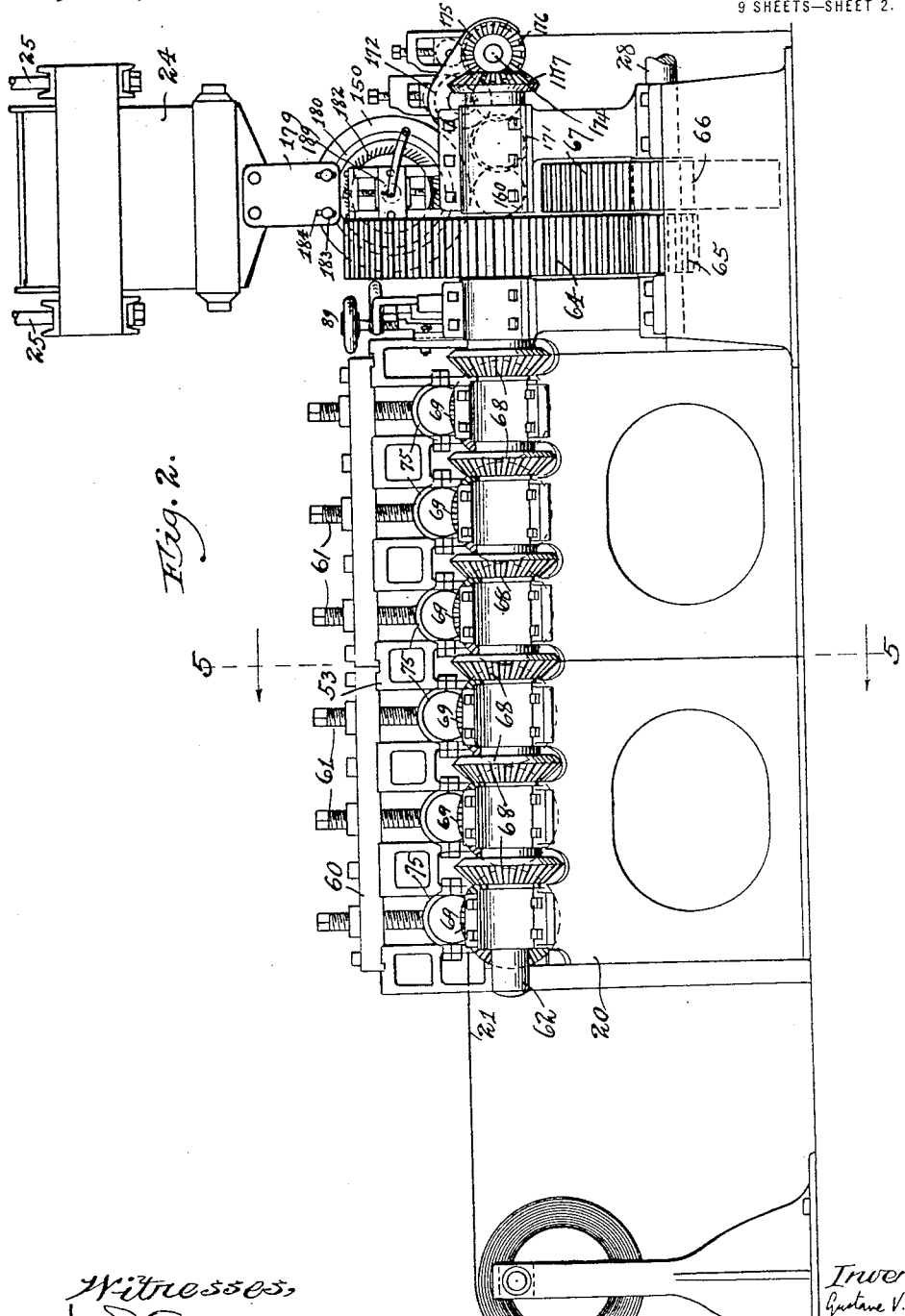

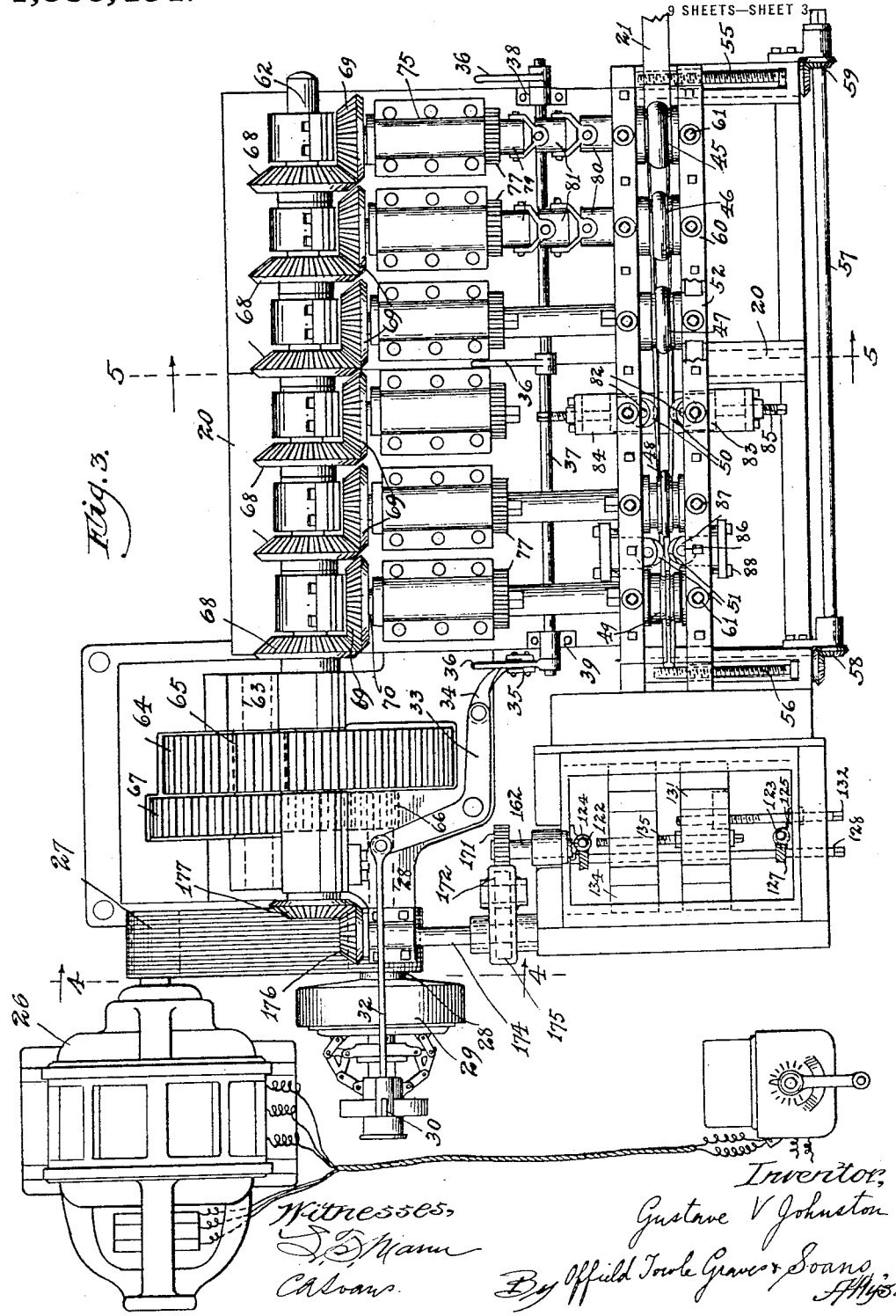

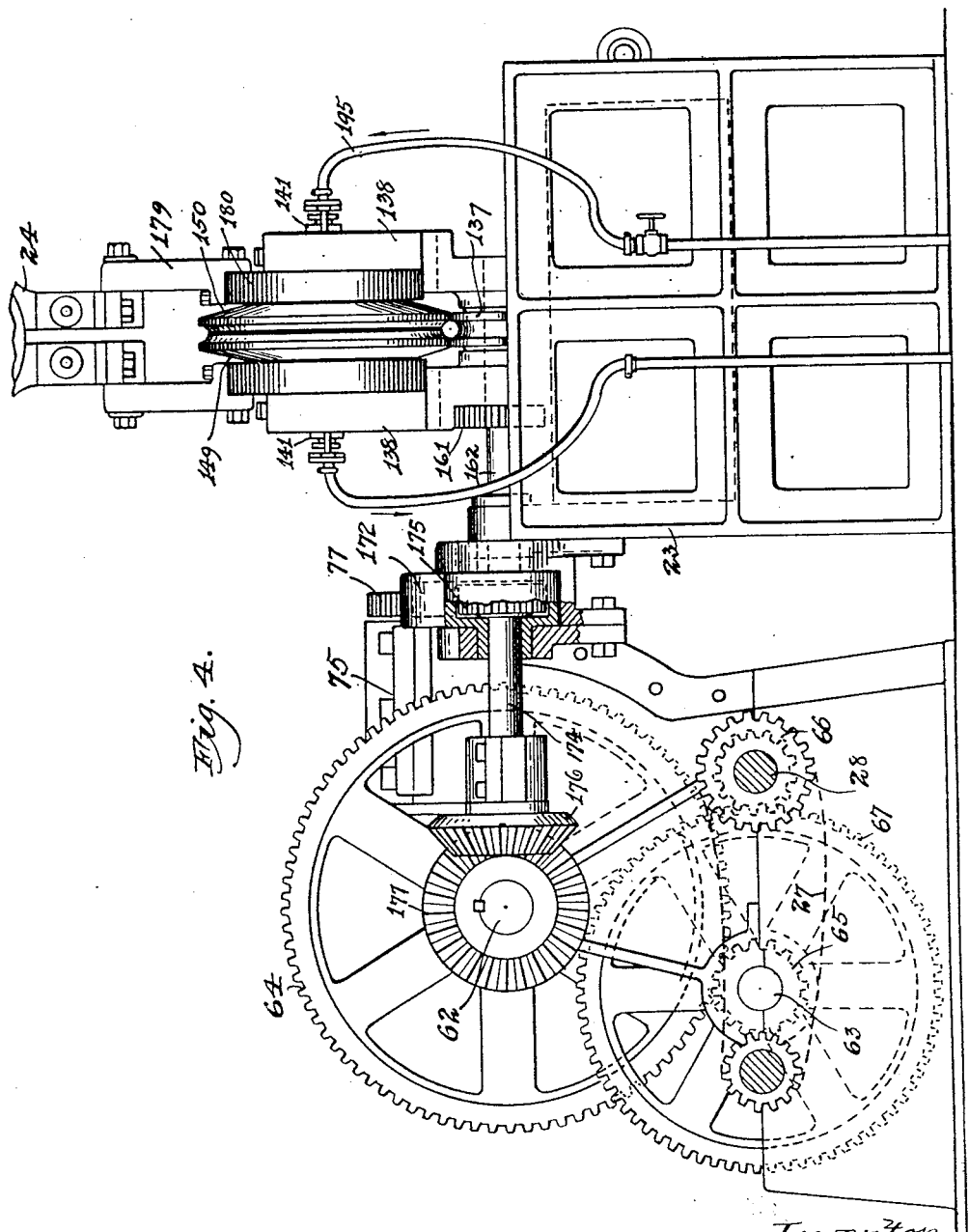

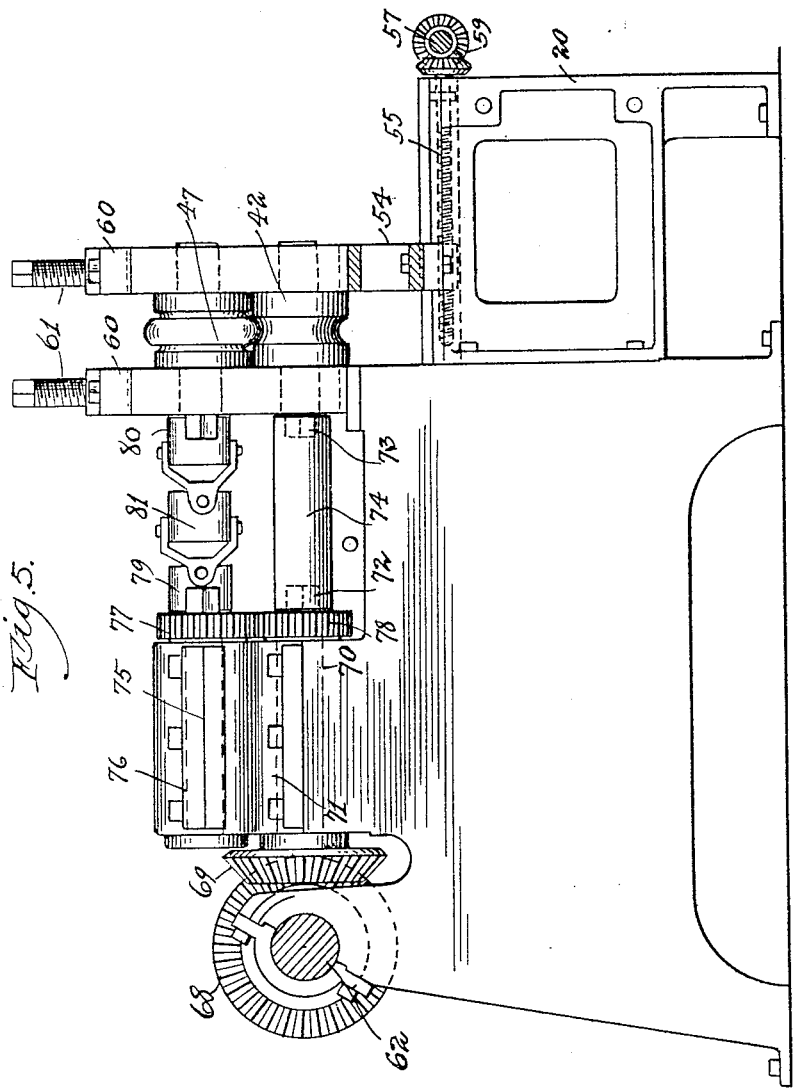

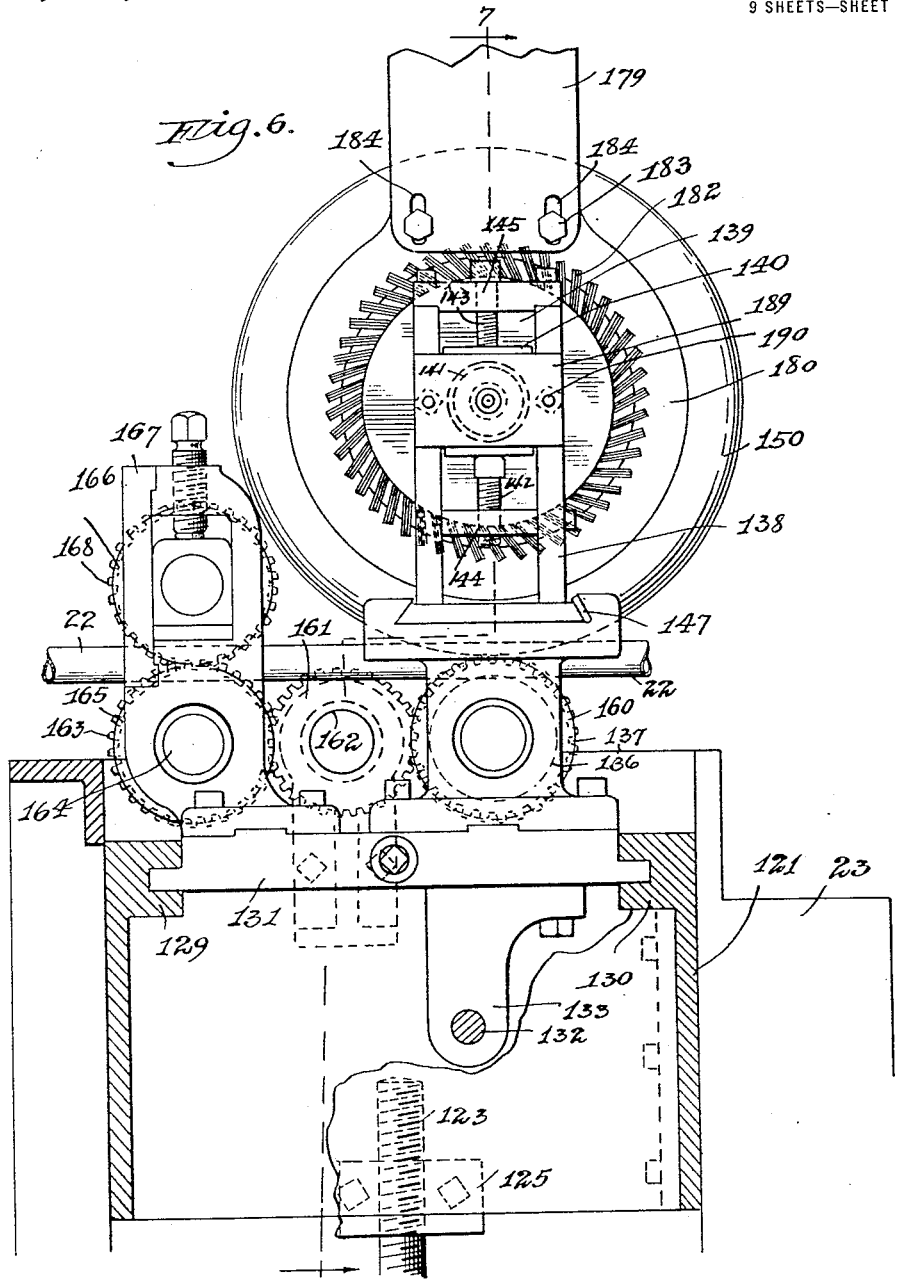

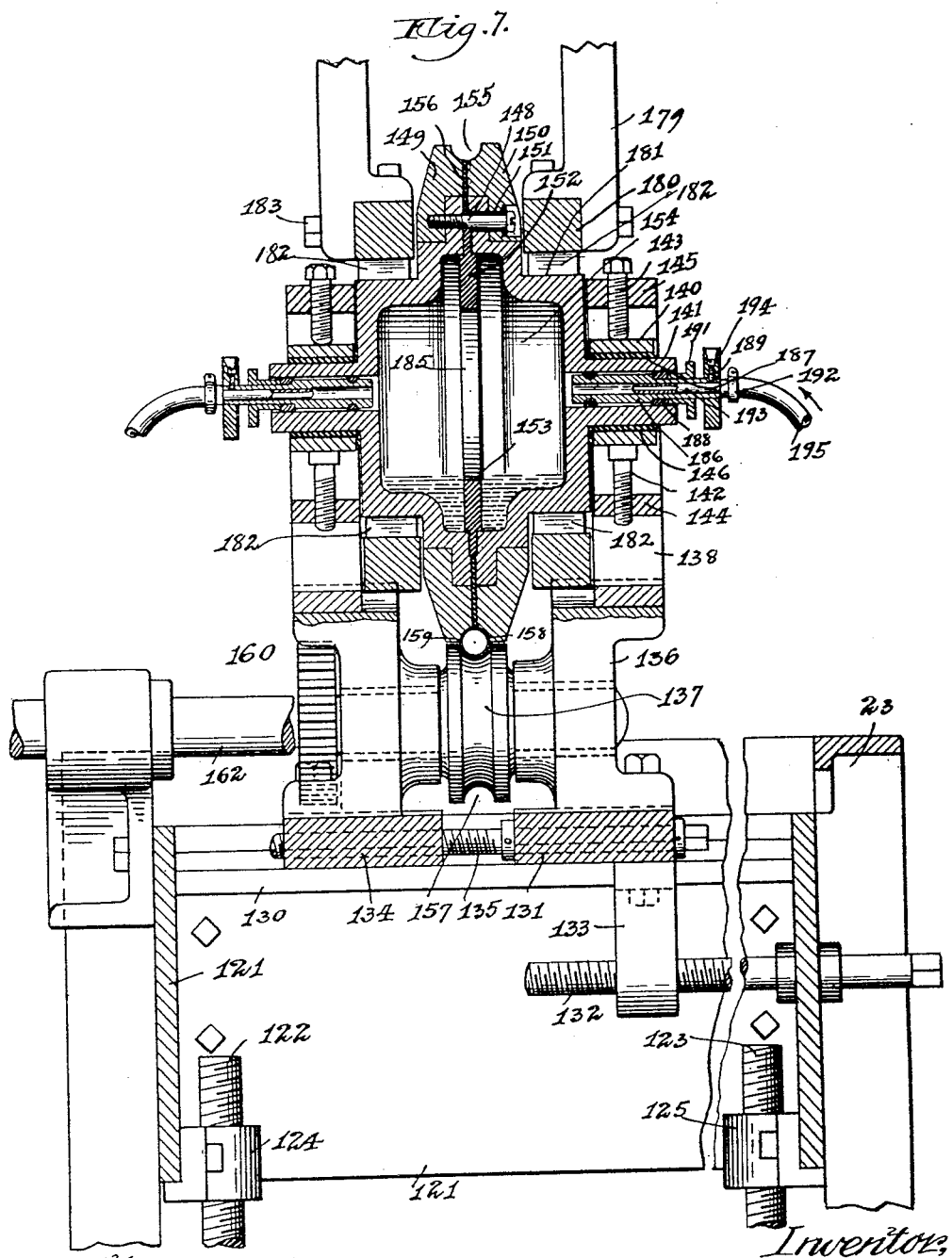

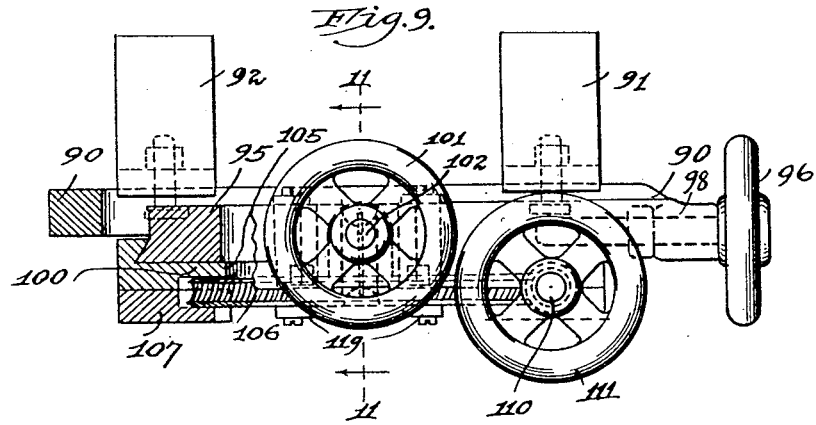
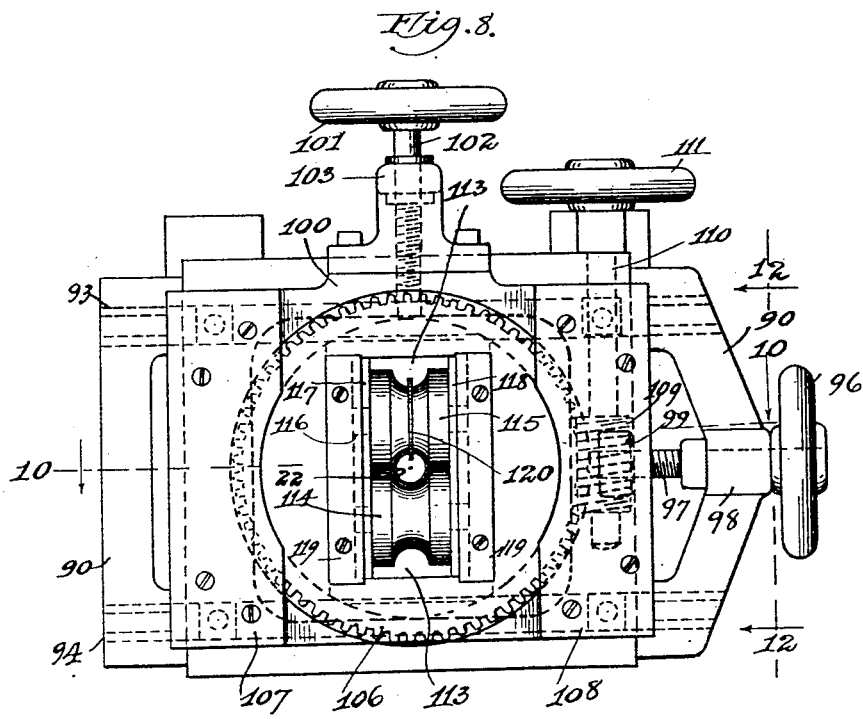

UNITED STATES PATENT OFFICE.

GUSTAVE V. JOHNSTON, OF CHICAGO, ILLINOIS, ASSIGNOR TO AMERICAN METAL MOLDING COMPANY.

METHOD AND APPARATUS FOR BUTT-WELDING THIN-GAGE TUBING.

1,388,434.      Specification of Letters Patent.      Patented Aug. 23, 1921.

Application filed June 9, 1919. Serial No. 302,932.

*To all whom it may concern:*

Be it known that I, GUSTAVE V. JOHNSTON, a citizen of the United States, residing at Chicago, in the county of Cook and State of Illinois, have invented a certain new and Improved Method and Apparatus for Butt-Welding Thin-Gage Tubing, of which the following is a specification.

The present invention relates to a method of butt-welding tubing electrically, such method being especially applicable to the high-speed production of thin-walled tubing of improved quality; and to apparatus for effecting continuous tube welding, such apparatus being particularly adequate for the practice of said method.

Electric welding of tubing, as heretofore it has been commercially practised, has always been a matter of relatively slow, difficult and costly accomplishment, and its commercial practice has been consequently restricted. This, notwithstanding that the enormous market for welded steel tubing and the long existent demand for a high-speed, economical method of producing it,—especially thin-walled, butt-welded tubing,—has caused many and prolonged efforts to be made to attain rapidity and economy in such electric welding. These desiderata I have successfully and commercially attained by my novel method and apparatus herein set forth; and with such minimized current requirement, such insignificant "scrap-losses", and such decrease in necessity for peculiar skill and training on the part of the operator that, I believe, I am now producing, by the method and means hereinafter described, an improved character of electrically welded thin-walled tubing and at a production rate and with operative economy that have not been before remotely approached by others.

The general reasons for failures of previous attempts to attain such results as I do, I believe to bottom on the many obscure and difficult conditions that enter into electric tube welding, and especially on failure of others so to correlate the factors of stock-feeding-rate, current control, and pressure application, that high speed of stock travel is made an advantageous primary condition that minimizes or obviates many heretofore existing difficulties, rather than being left to stand as a result desired, but unattainable by reason of those difficulties. Specifically, some things that have militated against prior practices of electric-butt-welding, particularly as to thin-walled tube-stock, are failure to secure and reliably maintain accurate meeting register of the edges to be welded; lack of knowledge of how to supply and control proper heating current; fusing or burning away of portions of the edges which were to be welded; overheating and fusing; under-heating, leaving portions of tubing unwelded; improper compressing, whereby portions of the edges were forced into lapped relation; heating the edges too far back into the body of the blank; failure to heat with requisite uniformity to a welding temperature at the edges without overheating; failure to apply the seam-closing compression at the critical time; failure to discover and secure the proper relations between speed of travel of the stock and amount, character, and manner of application of the heating current supply; these are some, but doubtless not all, of the factors which separately, or variously combined, I believe have defeated prior attempts so to make such tubing.

I have discovered how to effect the proper control of the amount and manner of application of the heating current, which is a matter of prime importance in effecting the butt-welding of metal tubing so as to attain the desired objects.

As the result of long continued experiments and repeated failures, I finally discovered that successful results are obtained by so applying and controlling the current that the extreme edges only—practically the edge surfaces only—of the thin stock are brought to a temperature approximating the fusing point (and possibly reaching that point) while the contiguous portions are not heated high enough to render them soft and mushy. After many discouraging experiments, I discovered that the proper application of the heating current involves using a relatively large amperage, using electrodes which contact with a relatively large arc of the circumference of the blank, so as to avoid spot-burning under the electrodes, establishing conditions for the flow of current such as to localize it as much as practicable to a condensed stream going across the gap or seam-cleft at the critical point for its maximum heating and metal-expanding effect, applying mechanical compression to close the seam-cleft at the right critical period, and so regulating the speed of travel of the blank through the welding throat as to carry the progressively-heated portions substantially out of the heating zone fast enough to arrest the raising of the temperature as soon as any given portion has reached the required welding temperature.

The raising of the metal to a welding temperature rapidly; the control of that temperature so that the metal does not actually fuse to a detrimental extent; the forcing together of the edges of the stock to effect the completed union at the very time when the proper temperature has been reached, and at the time that the stock is passing through that part of the welding throat wherein it is fully and accurately confined throughout practically its entire circumference, and the removal of the heated area out of the path of the heating current rapidly I have found, are important correlated factors contributing to success. This will be understood when it is considered that if the temperature be raised too slowly or maintained at high degree too long the edges of the blank are heated and softened for a considerable distance laterally from each edge, thus tending to produce detrimental sloughing and overlapping of the thus-softened edges and providing an undue accumulation of heat adjacent the seam line, which, of course, greatly retards the subsequent cooling and hardening of the metal and thus endangers re-opening of the seam. Moreover under relatively long continuous maintenance of the stock in the area through which current flows, there is greatly increased liability to "spot burning," that is, burning through or partly through the stock, and this danger is increased if the softening of the tube stock, while closely adjacent the roller electrodes, permits extrusion of metal to form a high bur.

Again, the successful upsetting, coalescence and welding together of the abutting edges of thin-gage stock is largely dependent upon maintaining the metal of the blank in substantially unsoftened condition throughout and almost, or quite, to the extreme edge margins; it being found that if the edges are softened for a substantial distance back into the body of the blank the upsetting will be distributed laterally and the liability of one edge buckling out of register with the other and lapping instead of properly upsetting, greatly increased.

The development of highest heating in only an extremely small localized area and the removal of that area from the path of the current rapidly that I provide for, is clearly an important factor because the greater the difference in temperatures between the upset and welded seam proper, on the one hand, and the metal of the blank adjacent thereto, on the other, the more rapid will be the dissipation of the heat and the more rapid the congealing of the union to a temperature and hardness that will effectually preclude opening of the weld after it has passed through the compression part of the throat, due to the resiliency of the blank and its tendency to spring open, formed in the way it is. Success may be accounted for, in part, on the theory that the weld is effected by relatively high pressure and compression at a relatively low temperature, or it may be due to the high degree of localization of the heat and its rapid dissipation after passing through the throat. Doubtless both of these factors contribute to the successful result.

Another factor which doubtless contributes to success, or widens the limits of variation of successful operation, is the use of water-cooled electrodes. I use electrodes of high conductivity, which by their contact with the blank being welded doubtless tend to cool the latter at the places of contact and thus to a corresponding extent prevent the heating of the blank to any considerable distance laterally away from the seam line In practice I have found that it is of importance to make the gap between the blank-contacting parts of the electrodes as small as feasible consistent with providing sufficient insulation between electrodes and sufficient gap to preclude arcing or burning, it being understood that the spacing or gap width may be less for very thin stock than for thicker gages.

In carrying my invention into practice, I have found the following conditions, stated generally, important for welding thin-stock, say from .050 down to much thinner gage:

First, that the apparatus which propels the tube-blank through the welding pass or throat (and which may be the mechanism for forming the tubular blank from ribbon steel stock) be so organized as to feed the stock forward at a steady and substantially uniform speed, i. e., without jerky or uneven movements;

Secondly; that the two electrodes take the form of rollers conforming to and embracing wide segments of the tube blank at the respective sides of the seam cleft; these roller electrodes being rigidly and reliably synchronized with each other so that there can not be any considerable bodily movement of one roller relatively to the other, either due to working stresses or to warping under the heat of the current; and the electrode rollers being maintained in substantially accurate and continuous register with the seam-cleft;

Thirdly; that the welding throat be formed of members conformed to the shape of the tube and which collectively completely, or substantially completely, inclose and support the blank throughout its entire circumference, thus providing against distortion of the thin tube under compression; the rolls which constitute the welding throat all having their axes in the same, or approximately the same, cross-sectional plane, so that the confining of the blank is coincident with the closing pressure thereon; while to provide good electrical contact between the abutting edges of the tube blank and between the tube-blank surfaces and the electrodes, the size of the throat should be sufficiently less than the external size of the tube blank passing therethrough to insure a pronounced compression and upsetting or mashing together of the edges of the blank at the time of welding but only, in the best practice, to a degree producing but a small bur accordant with the restriction of the greatest softening effect substantially to the lips of the seam-cleft;

Fourthly; that the electric current supply be approximately uniform; so far as I am at present advised, it should best be alternating current (I prefer to use 60 cycle current), and for welding tubing of .025 gage the apparent current should be about 12,000 amperes at an apparent voltage of approximately 1.5 volts, as measured across the insulated gap of the roller-electrodes at the nearest accessible point to their points of contact with the tube being welded;

Fifthly; that the forming rolls which transform the flat steel ribbon into the tubular blank be so organized that the edges of the blank are made to register accurately and are substantially without undulations or irregularities when they reach and pass through the welding throat;

And sixthly, that the feed-rate be sufficiently fast to remove the welded tubing quickly from the influence of the welding current; although of course it will be understood that as stock-thickness may be increased and the heat-requirement consequently raised, speed may be reduced accordantly; the fact that the roller electrodes make only substantially a line-contact with the tubing stock having a limitational influence on the capacity of such electrodes to feed current to the tube stock.

A characteristic feature or incident of the welded joint made in accordance with my invention is what for lack of a better term, I call a "recurrent" weld. The weld, although continuous, is nevertheless non-uniform in the texture of the metal which forms the seam and usually non-uniform in physical form. Instead, it embodies recurrent variations, consisting of alternating more and less completely annealed or fused portions, which correspond to the current alternations and consequent temperature fluctuation along the seam at the progressively differing instants of welding compression. And these recurrent variations of metal temperatures and consequent degrees of hardness and softness exhibit themselves more or less plainly in the bur or upset of the weld; the softer portions upsetting, and being forced out, more than the intervening cooler and harder portions. Frequently the bur of the weld exhibits a very clear "stitched-like" pattern, which is at once characteristic and indicative of the fact that the welding conditions are right to secure successful results. Other conditions being similar, both increasing the current flow and slowing down the rate of travel of the blank, tend to minimize the recurrent effect, and it may be, therefore, that this recurrent effect is not an inevitable concomitant of success in welding in accordance with my process. On the other hand, the recurrent effect becomes more and more pronounced as the speed of the blank is increased or the current flow lessened, until finally the weld is non-continuous and made only at the recurrent points of maximum heat, or entirely fails.

The object of the invention is to electrically butt-weld improved tubing rapidly and economically, and the invention consists in the matters herein set forth and more particularly pointed out in the appended claims.

In the drawings, which illustrate a preferred embodiment of suitable apparatus for carrying out my invention, as applied to the manufacture of light-gage steel tubing and having numerous features of advantage over any prior tube welding mechanism of which I am aware;—

Figure 1 is a front side elevation of the machine;

Fig. 2 is a rear side elevation of the machine, minus the motor;

Fig. 3 is a plan view of the machine showing the gearing with the welding devices removed;

Fig. 4 is a section taken on the line 4—4 of Fig. 3;

Fig. 5 is a section taken on the line 5—5 of Fig. 3;

Fig. 6 is an enlargement of a portion of Fig. 1, certain parts being shown in section to illustrate the mechanical construction;

Fig. 7 is a section taken on the line 7—7 of Fig. 6;

Fig. 8 is a section taken on the line 8—8 of Fig. 1;

Fig. 9 is a plan view of Fig. 8, partly in section;

Fig. 10 is a section taken on the line 10—10 of Fig. 8;

Fig. 11 is a section taken on the line 11—11 of Fig. 9; and

Fig. 12 is a section taken on the line 12—12 of Fig. 8.

Referring to the drawings, 20 represents a heavy cast iron frame upon which is mounted a set of rolls, both vertical and horizontal, for forming a flat strip of metal into circular shape. Said main frame 20 may be made sectional if so desired so that different numbers of sets of rolls may be employed as needed for different thicknesses and widths of strip, and 22 designates the same strip after it has been formed up into circular, or substantially circular, shape by the various rolls.

23 designates, as a whole, a cast iron frame upon which the welding devices and associated apparatus are supported. The transformer 24 is suspended above the welding apparatus by means of a set of four rods 25 having their upper ends suitably secured to the roof or ceiling of the room in which the apparatus is installed. A variable speed electric motor 26, by means of a silent-chain drive 27, actuates the main power shaft 28 through a manually-operable clutch 29.

The clutch 29 is preferably actuated by an upstanding hand lever 30 having its lower end pivoted to a small floor bracket 31. An intermediate point of said lever is connected, by means of a link 32, to a bell crank 33 (see Fig. 3), the rear end of said bell crank 33 being connected to a bent link 34. The forked end 35 of said link 34 is pivotally connected to one of a set of inclined levers 36 keyed to a longitudinal rock shaft 37. Said rock shaft is rotatably supported in small bearing brackets 38 and 39 carried by the frame 20, and may be manually actuated by means of one of said auxiliary hand levers 36, which are so distributed along its length that the operator can instantly stop the machine from any position.

The flat strip 21 is shaped up into circular form in easy stages by means of a series of bottom rolls 40, 41, 42, 43, and 44 which coöperate with a series of interfitting upper rolls 45, 46, 47, 48 and 49. The machine is also equipped with two pairs of similar side rolls 50—50 and 51—51 which shape the tube during the later stages of its development from a flat to a circular shape. The horizontal rolls 40 to 49 inclusive, are rotatably supported in bearing boxes, for instance as shown at 52, which, on their vertical sides, are suitably planed out to fit between cast iron uprights 53. The said uprights 53 are carried by a longitudinal base plate 54 which may be moved bodily transversely of the machine by means of a pair of traverse screws 55 and 56, capable of being actuated by a single hand-operated shaft 57 through sets of bevel gears 58 and 59. The tops of the skeleton uprights 53 are rigidly connected together by longitudinal cap pieces 60 into which are threaded the set screws 61 for effecting vertical adjustment of the horizontal rolls.

In order to effect longitudinal movement of the stock through the forming rolls, certain of the latter are positively rotated. Such rotation is effected through a longitudinal shaft 62 common to all of the driven rolls. Said shaft 62 (see Fig. 4) is driven by a shaft 63 through a pair of spur gears 64 and 65, and the shaft 63 is driven from the main power shaft 28 through a second pair of reduction gears 66 and 67. Keyed to the shaft 62 are a plurality of bevel gears 68 which coöperate with similar bevel gears 69 keyed to a series of parallel short transverse shafts 70 journaled in elongated bearing boxes 71 (see also Fig. 5). The opposite ends of the shafts 70 are squared, as shown at 72 in Fig. 5, and the adjacent ends 73 of the roll shafts are similarly squared in order to accommodate a short floating shaft 74 having its ends suitably apertured to loosely fit the said shaft ends 72 and 73. It will be understood that the floating shaft 74 has sufficient play on the ends of the shafts 72 and 73 to permit a limited amount of vertical adjustment of the bottom rolls 40 to 44 inclusive.

In certain cases it is advisable to drive some of the upper rolls, as well as the lower rolls, thereby securing more positive longitudinal movement of the tube as it passes through the forming rolls. To this end, the bearing-box 71 is formed with an upper story 75 which rotatably accommodates a short upper shaft 76 parallel with the lower shaft 70 and equipped with a spur gear 77 meshing with a spur gear 78 on the lower shaft 70. The adjacent ends of the shaft 76 and the upper roll shafts are made with square projections to fit similar driving collars 79 and 80 forming parts of a universal driving connection, designated as a whole 81, which permits a considerable vertical adjustment of the upper rolls whenever occasion requires.

The side rolls 50—50 (see Figs. 1 and 3) may be supported on short vertical shafts 82 carried in bearing-boxes 83 slidably arranged in opposite ends of a transversely disposed box-shaped frame 84 in which lateral adjustments of the said bearing-box 83 may be effected by horizontal set screws 85.

The set of vertical rolls 51—51 are carried by shafts 86 supported in small bearing-boxes, as shown at 87, adjustably supported in one of the hollow uprights 52 by means of four adjusting screws 88. Neither set of said vertical rolls is positively driven, but simply revolves idly as the tube passes through them.

In the event that the tube tends to twist or rotate about its axis in its passage through the forming rolls or as it is advanced to the welding mechanism, such tendency may be neutralized by a device designated as a whole 89, in Fig. 1, and shown in more detail in Figs. 8 to 12, inclusive. Such device, while serving to prevent twisting of the tube, may also, if desired, be employed to properly position the tube before it passes to the welding apparatus, as well as to straighten the tube or impart to it the desired degree of curvature to compensate for the distortion of the tube incident to the welding operation.

Such device, as a whole, is carried by a skeleton frame 90 rigidly bolted to the side of the uprights 91 and 92. Said skeleton frame 90 is formed with upper and lower transverse horizontal slideways 93 and 94 which slidably accommodate an inner skeleton rectangular frame 95, lateral horizontal adjustment of which is effected by means of a hand-wheel 96 keyed to the traverse screw 97 journaled in an integral boss 98 on the frame 90 and threaded into a part 99 of the inner frame 95. The vertically-extending sides of the inner rectangular frame 95 are suitably planed off to form guides for the vertically sliding plate 100, vertical adjustment of which is effected by a hand-wheel 101. Said hand-wheel 101 is keyed to the upper end of an adjusting screw 102 which is rotatably supported, but axially fixed, in a small bracket 103 bolted to the top of said plate 100, the lower end of said screw 102 being threaded in the upper end 104 of the inner frame 95.

The vertically-sliding plate 100 is centrally bored out to rotatably accommodate a turned shoulder 105 on the side of an axially horizontal worm-gear 106, axial movement of said worm-gear being prevented by means of a pair of vertically-extending side plates 107 and 108 bolted to the face of the plate 100. Said worm-gear 106 may be rotated by a worm 109 keyed to a vertical shaft 110 rotatably supported in the plate 100 and actuated by a hand-wheel 111.

The worm-gear 106 is formed with a rear box-like projection 112 surrounding the rectangular slot 113 in which the guide-rolls are rotatably supported. Said guide-rolls comprise a lower guide-roller 114 and a companion guide-roll 115 carried by shafts, as shown at 116 in Fig. 10, supported in vertical plate mountings 117 and 118. Said plate mountings 117 and 118 are held in place within the box-like portion 112 of the worm-gear by means of suitable retaining strips 119 screwed to the ends of the said box 112. The upper and lower guide-rolls 114 and 115 are turned out to provide mating semi-circular grooves which together form a circle having substantially the same diameter as the tube as it emerges from the series of forming rolls. It should be understood that the tube as formed by the forming rolls is not in the shape of a complete circle, since the edges of the tube-seam are separated slightly. An annular fin 120, projecting from the root of the groove in the upper guide-roll 115, fits within the gap between the said seam edges in the tube, and prevents rotary movement of the tube with reference to the said pair of guide-rolls 114 and 115.

Describing the welding apparatus, which is carried by the stationary frame 23, said rectangular frame 23 is formed with vertically-extending box-shaped guideways for receiving a vertically-slidable box-shaped casting 121, as shown best in Figs. 6 and 7. Said box shaped casting 121 may be adjusted vertically within the frame 23 by means of a pair of axially vertical screws 122 and 123 threaded into small bosses 124 and 125 bolted to the opposite sides of the box frame 121. Said adjusting screws 122 are driven in unison by worm-gears, for instance as shown at 126 in Fig. 1, which are actuated by worms, for instance as shown at 127 in Fig. 1, keyed to a horizontal shaft 128 journaled in the lower part of the main frame 23.

The upper part of the interior box frame 121 is formed with a pair of horizontally and transversely-extending slideways 129 and 130 within which slides a plate 131. Transverse movement of said plate 131 in the slideways 129 and 130 is effected by a suitable horizontal traverse screw 132 rotatably mounted, but axially fixed, in the frame 121 and coöperating with a threaded block 133 bolted to the lower side of the slide-plate 131. The slide-plate 131 carries certain bearings and mountings for one side of the welding apparatus, the companion bearings being mounted upon a somewhat similar plate 134, also slidable within the guideways 129 and 130, and spaced from the plate 131 by an adjustable screw 135 axially positioned and rotatable in the plate 131, but threaded into the plate 134.

The plates 131 and 134 serve as foundations upon which are bolted a pair of pedestals 136 bored out and suitably bushed to receive the journal ends of a roll 137. The upper ends of the pedestals 136 are enlarged and planed out to form ways to receive the feet of a pair of transversely slidable skeleton uprights 138.

In the rectangular openings 139 in the uprights 138 there are arranged to slide a pair of bearing-blocks 140 suitably bored out to receive the rotatable journal ends 141 of the welding or conducting rolls. Said bearing-blocks 140 may be adjusted vertically by means of pairs of screws 142 and 143, the lower screw 142 being threaded into a cross-bar 144, and the upper screw 143 being threaded into the cap piece 145. In order to prevent short circuits of the welding current, the bearing-blocks 140 are fitted with fiber bushings 146 within which the journal ends 141 rotate. The uprights 138 are maintained spaced apart from each other the necessary distance in the tops of the pedestals 136 by means of a pair of locking wedges 147.

Describing the welding rolls, it will be observed that they are of twin construction, coaxially arranged, and bolted together so as to prevent relative movement, either axially or radially, the two rolls practically operating as a single roll divided down the middle so as to prevent short circuiting of the welding current. The two rolls are secured together by means of a plurality of circumferentially spaced clamping screws 148, threaded into the left-hand roll 149 and insulated from the right-hand roll 150 (see Fig. 7) by means of fiber bushings 151. Axial alinement of the rolls is obtained by means of a ring or fiber 152 formed with inner turned shoulders 153 snugly fitting within the edges of the circular water chambers 154 within said roll. On account of the heat incident to the welding operation, the fiber 152 does not extend to the groove 155 in the welding rolls, the outer portion of the insulating cap being filled by an incombustible insulator 156, such as mica. As shown, said mica welding 156 may be of comparatively small thickness. For instance, in welding a one-inch pipe formed of steel strip .025 inch in thickness, the insulating gap at the groove of the rolls may be made $\frac{3}{32}$ of an inch in width with good results. The groove 155 is in shape almost a complete semi-circle, and, in conjunction with a similarly shaped groove 157 in the lower roll 137, forms a circle having a diameter equal to that of the tube 158 being operated upon. It will be understood, of course, that there is a slight gap 159 between the cylindric exterior circumference of the roll 137 and the conducting rolls 148 and 149, thereby preventing direct short circuits.

The welding rolls in the present instance need not be driven, but simply revolve idly, due to their being engaged by the traveling tube. The supporting roll 137 is, however, positively driven at the proper speed by a spur gear 160 keyed to one end of the roll shaft and driven by a spur gear 161 keyed to a driving shaft 162, means for driving which will be presently described. The spur gear 161 on said shaft 162 also drives a spur gear 163 on the shaft 164 of the lower one of a set of finishing rolls 165 and 166. Said finishing rolls 165 and 166 are supported in suitable bearing-blocks adjustably mounted in the upright frame 167, and the two rolls are geared together by means of a spur gear 168 on the upper roll shaft, which gear is meshed with the lower gear 163 on the lower roll shaft.

Preferably, the machine is equipped with a final idler roll 169 (see Fig. 1) vertically adjustable by means of the set screw 170, so as to enable the operator to bend the tube slightly as it emerges from the finishing rolls 165 and 166. This is for the purpose of correcting any possible tendency of the tube to become curved, due to the contractile effect of the hot metal on the welded side of the tube.

Describing the means for driving the shaft 162, the inner end of said shaft is extended rearwardly, and, as shown best in Fig. 3, to the end of said shaft 162 there is keyed a spur gear 171 which is driven by an intermediate floating gear 172 (see also Figs. 1 and 4) which is carried on a shaft journaled in a housing 173. Said housing 173 is pivotally swung upon a horizontal shaft 174, to which is keyed a spur gear 175 meshing with the gear 172. The shaft 174 is positively driven by means of a bevel gear 176 keyed thereto, and meshing with a bevel gear 177 keyed to the end of the main frame shaft 62. The arrangement of the gears 171, 172 and 175, which is similar to the gear arrangement on an old-fashioned screw-cutting lathe, enables the gear 172 to be swung around the axis of the shaft 174 whenever it is desired to change the gear ratio of the shafts 174 and 162 by replacing the gear 171 with one of different diameter and having a greater or less number of teeth.

Describing the electrical connections, the secondary winding of the transformer 24 comprises a number of one-turn coils all connected in multiple at their lower ends (see Fig. 4) to a pair of longitudinally-extending horizontal bus-bars 178. From the said bus-bars 178 massive copper conductors 179 extend downwardly and are bolted to a pair of massive copper annular brush-holders 180 co-axially arranged and concentric to the axis of the welding rolls 149 and 150. Each annulus is bored out considerably larger than the cylindric turned hub or enlargement 181 of the corresponding welding roll and is provided with a large number of flexible copper brushes 182 of approved construction, the rear ends of said brushes 182 being swaged into oblique slots or notches milled in the inner periphery of the said annulus. As shown, the said brushes are inserted at an angle to the radius of the annulus, the inclination being in the direction of motion of the welding roll. The inner contact surfaces of the brushes are bored out to a diameter slightly less than the diameter of the hub 181, so that when the latter is inserted the ends of the brushes will resiliently engage the said hub with sufficient pressure to make effective contact. The said annuluses 180 are secured to the conductors 179 by screws or bolts 183 passing through slotted holes 184 in said conductors 179, by means of which vertical adjustment of the annuluses is effected in order to bring the annuluses concentric with the welding rolls.

Cooling of the welding rolls is effected by chambering their interior, as shown at 154, the chambers in the adjacent rolls communicating with each other through the opening 185 in the fiber ring 152. Cooling water is admitted to the cavity through the spindle of one roll and discharged through the spindle of the other roll.

Describing the gland connections for effecting such water connection, it will be seen that the spindle of each roll is bored out cylindrically, slightly greater in diameter than the sleeve 186, the ends of said sleeve 186 being packed with flexible packing rings 187 and 188. The outer end of the said sleeve 186 is reduced in diameter, as shown, and extends outwardly beyond the end of the spindle a sufficient distance to enable its outer extremity to be secured into a rectangular plate 189, secured to the upright frame 138 by suitable bolts 190, said bolts 190 being provided with nuts on both sides of the said plate 189 to accurately position the latter. Preferably, pressure is applied to the outer packing 188 by means of a suitable gland 191 inserted in the outer end of the roll journal. The flexible water hose 192 may be connected to the sleeve 186 by means of a pipe 193 driven into the said sleeve and clamped therein by a set screw 194 in the plate 189. The outer end of the water tube 193 is secured in the end of the hose by a hose clamp 195.

My improved process of welding is readily carried out with an apparatus like that herein described. The blanks cut to exact width and of desired gage, are fed through the forming rolls and welder proper at regulated, uniform speed, controlled by the speed-regulating mechanism of the machine. The current flow is regulated and adjusted, by means of the current controls described, to correspond to the rate of travel of the blank, its thickness, character of metal, etc., to conform to the welding conditions described, and with reasonable skill and care no difficulty is met in successfully welding thin stock of the character described.

The high rate of travel of the material being welded renders the process extremely economical and desirable. By way of example, on .025-inch gage stock, one inch tube diameter, with voltage and amperage as hereinbefore indicated for that gage, I have commercially produced tubing at about 70 feet per minute, and under proper current changes at higher rates. The extremely limited extent to which the blank is heated, both in the matter of temperature and actual amount of metal heated enough to modify its character, results in producing a product of very high grade and uniformity. The process has opened up a very large field of commercial welding heretofore not practised.

I claim as my invention:

1. An improved process of butt-welding thin gage tubing, which consists in passing a sheet metal blank of excess diameter through a throat formed by a plurality of rollers grooved to conform in size and shape to the exterior contour of the welded tube and held rigidly against yielding, so as to effect an upsetting of the blank edges and a reduction of the diameter of the blank as it passes through said throat, said rollers collectively embracing and supporting the blank throughout substantially its complete circumference and being arranged so that their line of contact lies in a single plane, causing said blank to progress continuously and steadily through said roller throat and simultaneously passing a current of relatively large amperage across the joint between the edges of the blank being butt-welded, whereby concurrently with the heating and softening of the edges of the blank the latter is swaged and compresed to the size of the roller-pass, and welding thereby effected.

2. The process of butt-welding thin gage tubing, which consists in progressively maintaining the edges of a tubular blank in accurate abutting register with each other and progressively, regularly, and at relatively high speed, reducing the size of the tubular blank and upsetting and welding together the edges thereof, by applying a circumferential line of pressure substantially continuous around the blank, except at the welding seam, simultaneously passing a heavy electric current through and across the seam cleft between said abutting edges, localized and chiefly confined to a path coincident with the zone of maximum compression of the blank and regulated to produce a welding heat below a fusing heat in the edges of the blank.

3. The method of electrically butt-welding thin-gage metal, which consists in conducting a suitable amperage of A. C. current across the seam-cleft, simultaneously effecting a relative traverse of the parts being welded past the current path at such regulated speed as to produce distinct alternate higher and lower temperature portions, the latter portions at no time reaching a fusing temperature, and simultaneously and progressively upsetting the abutting edges against each other.

4. The improvement in the art of butt-welding, which consists in conducting A. C. current of suitable amperage across the cleft of the seam to be welded progressively along said seam, regulating the current volume and rate of progression to produce localized distinct variations in temperature of the abutted edges, corresponding to maximum and minimum current-flow periods across the seam-cleft, the portions of minimum temperature being kept well below fusion and those of higher temperature so low as to preclude more than incipient fusion of the metal, and while in such state forcing the walls of the seam-cleft into welding intimacy.

5. In the art of electrically welding thin-gage steel tubing, the method which consists in pressing the seam-walls into abutting contact causing an alternating welding current of suitable amperage to flow across the seam between electrodes, and effecting a relative traverse of the tube and electrodes at such rate as to bring about a material fluctuation in the temperature at the seam at the moment of welding, said fluctuation synchronizing with the alternations of the welding current.

6. A process of making electrically butt-welded thin-walled steel tubing wherein the abutting walls are united by a recurrent weld, which consists in pressing the abutting walls into welding contact, causing an alternating welding current to flow across the seam, and advancing the tube at a rate sufficient to produce a recurrent welding effect synchronizing with the alternations of the welding current.

7. A process of making electrically butt-welded thin-walled steel tubing wherein the abutting walls are united by a recurrent weld, which consists in pressing the abutting walls into welding contact, causing an alternating welding current to flow across the seam, and advancing the tube at a rate sufficient to produce a substantially continuous weld exhibiting a recurrent welding effect synchronizing with the alternations of the welding current.

8. An improved process of electrically butt-welding very thin plate metal, which consists in mechanically confining the edges to be united in abutting register, sending current across the seam gap of such character and in such manner as to produce incipient fusion only at closely spaced intervals along the seam and heated but non-fused portions between said incipient-fused parts, and mechanically forcing said abutting edges together and so upsetting them while in the heated condition specified.

9. An improved process of electrically butt-welding very thin plate metal, which consists in mechanically confining the edges to be united in the same plane and in abutting register, sending current across the seam gaps progressively, of such character and in such manner as to progressively produce incipient fusion only of the abutting edges at closely spaced apart intervals along the seam and heated but non-fused portions between said incipiently-fused parts, and mechanically forcing said abutting edges together progressively and upsetting them while in the heated condition specified.

10. A method of butt-welding metal tubing, which consists in causing successive distinct impulses of current to flow across successive, unfused, contiguous short lengths of the butted surfaces of a seam, each such length being subjected to compression during the impulse-receiving period, whereby each length of said contacting surface in succession attains its welding temperature under welding pressure during a single impulse-period.

11. The method of welding the abutted surfaces of an open butt-seam in metal, which consists in causing successive impulses of electric current to flow across said seam, while applying pressure to the metal, greatest in a plane transverse to the seam, to force said abutted surfaces most firmly together in such plane, thus reducing the electrical resistance of the seam and causing the flow of current to be concentrated largely in said plane, and continuously causing relative movement of said metal and said plane longitudinally of said seam at a rate to cause said successive impulses of electric current to flow through, and to heat and successively weld together, successive short, contiguous lengths of said seam.

12. The method of welding the abutted surfaces of an open butt seam in metal which consists in applying the terminals of an alternating current circuit to the metal upon opposite sides of the seam in close proximity thereto and in substantially a plane transverse to the seam, causing relative movement longitudinally of the seam between said terminals and said metal, simultaneously applying pressure to the metal to close the seam, said pressure being applied in the plane of the contact of said terminals with said metal, whereby the flow of current across the seam is concentrated largely in said plane and said contacting surfaces are progressively heated and welded together thereby, the speed of said relative movement being such that successive alternations of said current pass through successive unfused short lengths of the contacting surfaces of said seam.

13. The method of electrically welding the abutted surfaces of an open butt seam in metal, which consists in sending alternations of electric current of uniform frequency across said seam, the greatest density of each impulse of said current being in a narrow zone of said abutted surfaces transverse to the seam, said current being of sufficient volume to cause only said narrow zone of said contacting surfaces to attain welding temperature, and causing relative movement longitudinally of the seam between the metal and the point of application of current to the metal at set speed that a distinct zone of the metal is presented to the point of current application as each impulse of current is at its maximum intensity.

14. The method of welding the abutted surfaces of an open butt seam in metal which consists in applying the terminals of an alternating current circuit to the metal upon opposite sides of the seam in close proximity thereto and in substantially a plane transverse to the seam, applying pressure to the metal to close said seam in substantially the plane of the contact of said terminals with said metal, whereby the flow of current across the seam is concentrated largely in said plane; causing relative movement between said metal and said terminals longitudinally of the seam, and so correlating the speed of said movement with the intensity and frequency of said current as to cause said seam to be progressively welded in short contiguous lengths by the successive alternations of the current, through the softening of the edges at those points that are in the plane of maximum pressure concurrently with maximum current flow to a greater degree than the intervening points.

15. The method of joining the abutted surfaces of an open butt seam in metal which consists in welding the same together by a succession of distinct welds, each weld being completed by a single impulse or alternation of electric current of known frequency, and successive welds being made at theretofore-unfused points along the seam line by successive alternations of said current.

16. The method of welding the abutting surfaces of an open butt seam in metal tube-stock which consists in applying the terminals of an alternating current circuit to the metal upon opposite sides of the seam in close proximity thereto and each in contact with the metal along a transverse line approximating one-fourth of the perimeter of the tube-stock, applying counter-pressure to the opposite side of the tube perimeter, in continuation of said contact line, throughout approximately its remaining half of the tube's perimeter, and moving said tube-stock across said plane of pressure at a rate such that successive, short, unfused lengths of the seam are presented in said pressure plane at the successive instants of maximum current-flow, to be welded by the heat and pressure, and whereby each such length is successively removed from the plane of maximum pressure and current-flow so rapidly as to induce rapid setting of the weld.

17. The method of progressively welding the butt-seam of a tubing blank that consists in passing the blank so rapidly through a blank-compressing throat, that acts on the blank in a transverse plane and is formed of roller set including electrodes that make contact with the blank throughout large arcs and closely straddle the seam-line, and supplying to said electrodes alternating current of such frequency and intensity that at each successive attainment of greatest current intensity in the seam-traversing flow a section of the blank having unfused seam-edges is present in the plane of electrode-contact and that current flows across the seam adequate to bring only those edge portions of the blank that are very close to said plane up to approximately fusing temperature.

18. The method of electrically butt-welding thin-walled metal stock which consists in applying welding pressure intimately to close the seam-cleft and applying impulsive welding current to traverse the pressure-closed seam cleft, all in such continuous and rapid progression along the seam-line as to bring the metal at successive points regularly and constantly repeated in the seam to distinctly different maximum temperatures.

19. The method of electrically butt-welding thin walled tubing which consists in applying welding pressure to a transverse, narrow zone of the tube stock intimately to close the seam cleft and applying impulsive welding current to traverse said zone, all in such continuous and rapid progression and with such pressure and current density as to produce a substantially continuous weld exhibiting in the seam a recurrent welding effect synchronizing with the impulses of the welding current.

20. In electric butt-welding apparatus, the combination with means for feeding a blank and a source of suitable current, of a welding throat formed in part of a pair of insulated structurally synchronized electrode rolls, the remainder thereof formed by roller means which, together with said electrode rolls, confine and compress said blank throughout substantially its complete circumference; the axes of said rolls all lying in substantially the same transverse plane, so that the line of contact between the rolls and the blank lie in one plane.

21. In electrical butt-welding apparatus, the combination with means for feeding a blank and a source of suitable current, of roller means supporting the blank and maintaining it positively and accurately centered relatively to the electrode rolls, and a pair of electrode rolls arranged side by side, insulated from each other and structurally synchronized to move and operate as a single unit, the contacting faces of said electrode rolls being conformed to the surfaces of the tube blank contiguous to the seam cleft therein, and said rolls being spaced apart as to their contacting surfaces a distance approximating the gage thickness of the blank being welded.

22. In an electric butt-welding apparatus, means forming a blank-compression throat, and including roller means to support the blank and roller-electrodes arranged to closely straddle the seam and make contact with the metal on each side of the seam throughout a large arc; means for supplying alternating current of given frequency to said electrodes and of voltage and amperage regulated so that each impulse brings only a short length of the extreme edge portion of the blank, compressed in the throat, to approximately fusion temperature; and means for feeding a blank through the welding throat at a speed to present in the welding throat, at the time of each current impulse, a theretofore unfused section of the seam.

23. In an electric butt-welding apparatus the combination of means for feeding a tube-blank longitudinally through the welding throat, and a welding throat of slightly less sectional area than the cross section of the tube blank, said throat comprising, and being formed by the junction of peripheral grooves in two electrode rollers insulated from each other and having a common horizontal axis, each of the electrode grooves encompassing almost 90 degrees of the circumference of said throat, and a third pressure roller, also having a horizontal axis and its peripheral groove encompassing almost 180 degrees of the circumference of said throat, hereby providing substantially complete circumferential pressure in a single plane.

24. In combination, means for feeding a tubular blank, a source of suitable electric current, electrode rolls, rigidly synchronized with each other, peripherally conformed to the engaged parts of the tube blank, insulated from each other, and together embracing and contacting with not less substantially than one third the circumference of the tube, roller means embracing, confining and rigidly supporting substantially all of the circumference of the blank not engaged by the electrodes, both electrodes and said roller means being journaled with their axes substantially coincident with a common transverse plane, and means for feeding blanks rapidly and uniformly through the welding-pass organized as set forth.

25. In electrical butt-welding apparatus, a welding-pass formed in part of a duplex welding roll the two parts whereof are insulated but rigidly united, so that their peripheries act unitedly or in complete synchronism as a compressing and confining unit, coöperative pass forming means associated with said duplex element, whereby the abutted edges of a blank fed through said pass are positively forced together and upset upon each other, means for feeding a blank through said welding pass rapidly and at a uniform rate of speed, a source of suitable electric current and regulating means for controlling said current relatively to the resistance of that part of the blank in circuit and to the rate of travel of the blank, whereby the upsetting and welding are effected at a temperature approximately that of incipient fusion of the abutting surfaces of the edges of the blank.

26. In electrical butt-welding apparatus, a welding-pass formed in part of a duplex welding roll the two parts whereof are insulated but rigidly united, so that their peripheries act unitedly or in complete synchronism as a compressing and confining unit coöperative pass forming means associated with said duplex element, whereby the abutted edges of a blank fed through said pass are positively forced together and upset upon each other, means for feeding a blank through said welding pass rapidly and at a uniform rate of speed, a source of fluctuating current and regulating means for controlling said current relatively to the resistance of that part of the blank in circuit and to the rate of travel of this blank, whereby the upsetting and welding are effected at a temperature approximately that of incipient fusion of the abutting surfaces of the edges of the blank.

27. In electrical butt-welding apparatus, a welding-pass formed in part of a duplex welding roll the two parts whereof are insulated but rigidly united, so that their peripheries act unitedly or in complete synchronism as a compressing and confining unit, coöperative pass forming means associated with said duplex element, whereby the abutted edges of a blank fed through said pass are positively forced together and upset upon each other, means for feeding a blank through said welding pass rapidly and at a uniform rate of speed, a source of alternating electric current and regulating means for controlling said current relatively to the resistance of that part of the blank in circuit and to the rate of travel of the blank, whereby the upsetting and welding are effected at a temperature approximately that of incipient fusion of the abutting surfaces of the edges of the blank.

28. In electrical apparatus for butt-welding a tube-blank, a welding pass formed in part of two roller electrodes, closely confronting, insulated from each other, rigidly synchronized, and having a single axis of rotation, each said electrode having a peripheral groove of nearly 90 degrees arc, and coöperative pass-forming roller means having a single axis of rotation parallel with the axis of the electrodes, the last said roller means being peripherally grooved to coact with nearly 180 degrees of the tube-blank perimeter, and means for supplying current impulses to said electrodes.

29. In electrical apparatus for butt-welding a tube-blank, a welding pass formed in part of two roller electrodes, closely confronting, insulated from each other, and having a single axis of rotation, each said electrode having a peripheral groove of nearly 90 degrees arc, and coöperative pass-forming roller means having a single axis of rotation parallel with the axis of the electrodes, the last said roller means being peripherally grooved to coact with nearly 180 degrees of the tube-blank perimeter, means for feeding the blank through said welding pass rapidly and at uniform rate of speed, a source of fluctuating current for the electrodes, and regulating means for controlling said current relatively to the resistance of that part of the blank in circuit and the rate of travel of the blank, the frequency of current-fluctuation and rate of blank-speed being related for the presentation of an unfused section of the tube-blank-seam in the welding pass at the time of each attainment of maximum current-value traversing the blank.

30. In an electrical butt-welding apparatus, a roller electrode having a cylindrical hub or enlargement, an annular brush holder encircling it, and a large number of brushes set obliquely in the annular brush holder and bearing on the periphery of said hub or enlargement.

31. In an electrical butt-welding apparatus, a roller electrode having a cylindrical hub or enlargement, an annular brush holder encircling it, a large number of brushes set obliquely in the annular brush holder and bearing on the periphery of said hub or enlargement, and means for effecting relative adjustment between the hub and the brush holder.

GUSTAVE V. JOHNSTON.